United States Patent
Shiota et al.

(10) Patent No.: US 6,683,700 B1
(45) Date of Patent: Jan. 27, 2004

(54) PICTURE PRINTING SYSTEM

(75) Inventors: Kazuo Shiota, Tokyo (JP); Norihisa Haneda, Saitama-ken (JP); Shigekazu Fukada, Tokyo (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 713 days.

(21) Appl. No.: 08/956,029

(22) Filed: Oct. 22, 1997

(30) Foreign Application Priority Data

Oct. 22, 1996 (JP) .............................................. 8-279206

(51) Int. Cl.[7] .............................................. G06F 15/00
(52) U.S. Cl. ........................................ 358/1.6; 358/1.13
(58) Field of Search ................................. 395/101, 106, 395/111, 114; 382/260, 263; 358/1.1, 1.6, 1.12, 1.13, 1.14, 1.15

(56) References Cited

U.S. PATENT DOCUMENTS 5,448,372 A * 9/1995 Axman et al. ............... 358/474
5,619,738 A * 4/1997 Petruchik et al. ........... 396/311
5,696,850 A * 12/1997 Parulski et al. ............. 382/261

* cited by examiner

Primary Examiner—Mark Wallerson
(74) Attorney, Agent, or Firm—Birch, Stewart, Kolasch & Birch, LLP

(57) ABSTRACT

Using a picture image printing system, both types of pictures recorded by a camera using a film and a digital camera are effectively printed. The printing system comprises a film scanner for inputting a picture recorded on a film, and a card reader for inputting a picture recorded by a digital camera. By switching between the scanner and card reader upon necessity, digital image data is obtained. An image processing apparatus performs pixel number conversion on the digital image data by keeping an aspect ratio of the image constant, so that the picture image data is printed in a width almost the same as a width of rolled paper. The digital image data whose pixel number has been converted are subsequently printed on the rolled paper by a printer.

16 Claims, 2 Drawing Sheets

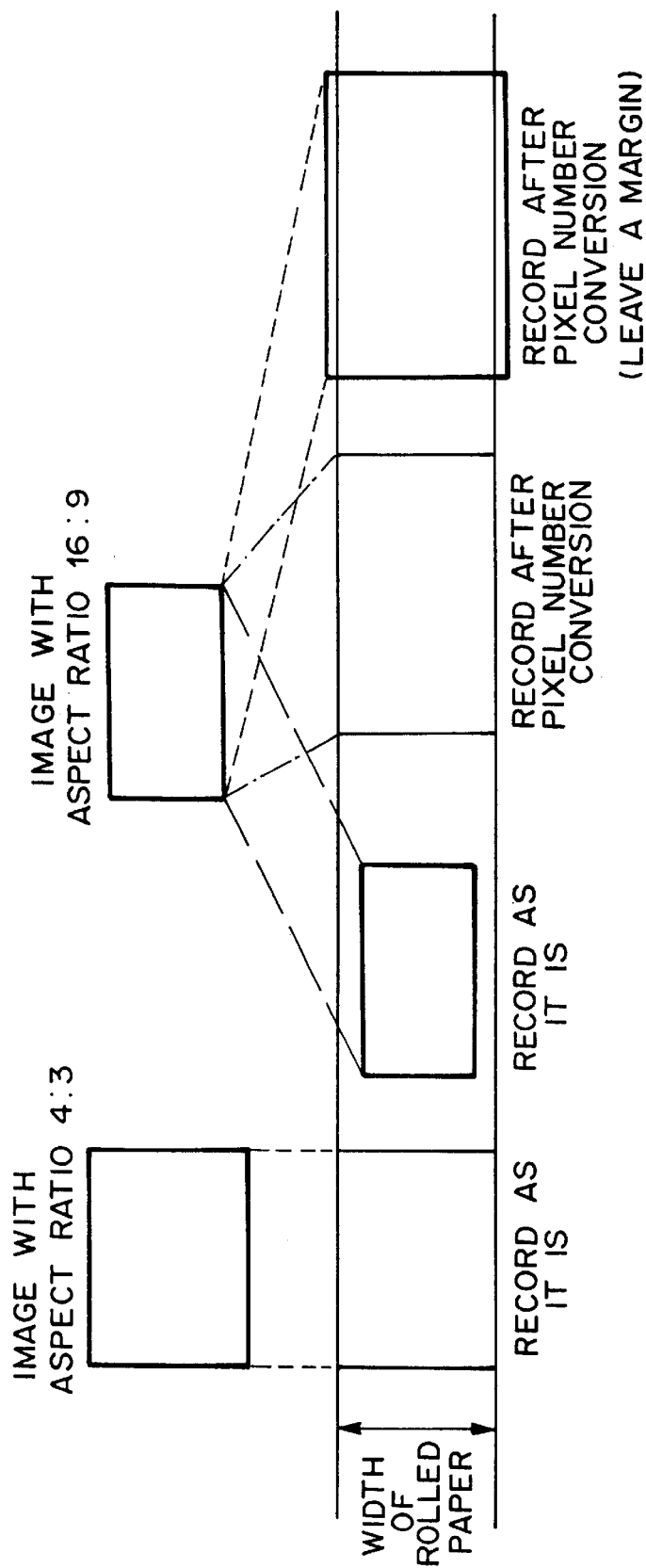

PICTURE PRINTING SYSTEM

BACKGROUND OF THE INVENTION

1. Field of the Invention

The present invention relates to a picture printing system. More specifically, the present invention relates to a printing system shared by a camera using a film and a digital camera, for printing pictures recorded by both types of cameras.

2. Description of the Related Art

A picture printing system has been known which obtains an image signal by reading a picture image recorded on a film with a film scanner, digitizes the obtained signal, and outputs the digital image data in the form of a picture print after image processing for correcting a color or tone is carried out on the digital image data.

On the other hand, a digital camera which records a picture image using an electronic image pickup device instead of a film is becoming widespread, and it is necessary for a picture image recorded by a digital camera to be output in the form of a print.

A picture recorded by a digital camera is normally displayed on a liquid crystal monitor attached to the digital camera, a TV screen, or a personal computer display, rather than output as a picture print. Therefore, an aspect ratio of the picture recorded by a digital camera is different from that of a picture recorded by a camera using a film.

Some conventional picture printing systems as described above have a function for accepting digital image data input via a floppy disc or the like. However, this function is provided for temporarily storing a picture image read from a film in a floppy disc or the like, and for reproducing the image later. Therefore, this function cannot deal with the wide variety of aspect ratios of pictures recorded by a digital camera.

For this reason, when a picture recorded by a digital camera needs to be printed out using the digital input function of the conventional picture printing system, an appropriate picture print cannot be obtained due to a large area being trimmed, for example.

One method of solving this problem is to provide an additional printing system for printing a picture recorded by a digital camera. However, this method does not seem to be a practical solution due to problems regarding cost, a place to set the system in, and an operational flow, when a printing system for a picture recorded by a camera using a film already exists. Therefore, a picture printing system is desired which can print a picture recorded by a digital camera effectively in terms of time, space, and cost.

SUMMARY OF THE INVENTION

Based on the problems described above, an object of the present invention is to provide a picture printing system which can effectively print a picture recorded by either a digital camera or a camera using a film.

The picture printing system of the present invention is a picture printing system which records digital image data representing a picture image on rolled paper having a predetermined width, comprising image reading means for obtaining the digital image data by reading a picture image recorded on a film and/or in a picture print, data inputting means for inputting an image obtained by a digital camera as the digital image data, and pixel number converting means for carrying out a pixel number conversion on the digital image data input by either the image reading means or the data inputting means keeping an aspect ratio of the picture image constant so that either vertical or horizontal length of the picture image represented by the digital image data almost coincides with the predetermined width.

"Reading a picture image recorded on a film and/or in a picture print" herein means to read a picture image from a film using a transmission type scanner (a film scanner) or to read a picture image from a picture print using a reflection type scanner. In other words, the picture printing system of the present invention comprises either a film scanner or a reflection type scanner, or both, as "the image reading means".

"The data inputting means" is meant to include a conventional floppy disc drive or the like. More preferably, the data inputting means is a means which can most easily transfer data from a digital camera to the picture printing system. More specifically, if a digital camera uses a memory card, a card reader is equivalent to the data inputting means, while a cable connection interface or the like is equivalent to the means if a digital camera uses a built-in memory for storing an image. Practically, it is preferable to comprise a plurality of such inputting means so that a variety of cameras can be dealt with by the picture printing system of the present invention.

The image reading means and the data inputting means are used by switching from one to the other upon necessity. The switching may be carried out manually. However, it is preferable to automatically switch between the means in such a manner such that a film scanner is selected by detecting that a film is set in a scanner. This switching may not necessarily be carried out at each film or card memory, and can be carried out at each film frame or image data in a memory.

"Carrying out a pixel number conversion keeping an aspect ratio of the picture image constant so that either vertical or horizontal length of the picture image represented by the digital image data coincides with the predetermined width" means processing for matching a picture image size with the width of the rolled paper for avoiding a portion of the picture image not being printed because the picture image size exceeds the width of the rolled paper, or a large margin being left on the rolled paper because the picture image size is too small.

Therefore, the size of the picture image to be obtained by the pixel number conversion should only be the size satisfying the above condition, that is, the size which is "almost the same as the predetermined width", and does not need to be the size completely coinciding with the width of the rolled paper. In an actual picture printing system, occurrence of trimming caused by an error is sometimes avoided by setting the picture image size a little larger than the width of the rolled paper. The size "almost the same as the predetermined width" is meant to include the size in the case such as the above.

Generally, "an aspect ratio" is the ratio between vertical and horizontal lengths of an image. "Carrying out a pixel number conversion keeping an aspect ratio of the picture image constant" means that the pixel number conversion is carried out while an ratio of pixel numbers in the vertical and horizontal lengths in the digital image data representing a picture image is kept constant. In some cases, the aspect ratio may not be kept precisely constant, since the pixel numbers are integers. However, such a case is meant to be included in the present invention. In other words, an error is tolerated to some degree as long as distortion or trimming of the picture image does not cause visual discomfort.

For carrying out the pixel number conversion so that either the vertical or the horizontal length coincides with the width of the rolled paper, a function for setting an arbitrary magnification in response to the input picture image size is necessary. However, the number of pixels in the input digital image data often has some limit. Therefore, some predetermined magnifications of the pixel number conversion may be set in advance so that an operator can select a suitable magnification among them. Alternatively, information regarding the size may be added to image data as a portion of accompanying information so that a picture printer can calculate a magnification based on the information.

"Carrying out a pixel number conversion" is meant to include the case where the pixel numbers do not change as a result of the conversion, that is, the case where the conversion magnification factor is 1. As a method of pixel number conversion, any filtering and interpolation methods can be applicable. The conversion may be carried out as a single processing only to convert the pixel numbers. Alternatively, the conversion may be carried out together with processing for correcting a color or tone.

The picture printing system of the present invention comprises respective means for obtaining digital image data from a camera using a film and a digital camera. Means for carrying out image processing or outputting processing on the obtained digital image data and rolled paper on which the picture image is printed are common for both the digital camera and a camera using a film. Therefore, the picture printing system of the present invention can deal with pictures recorded by both a digital camera and a camera using a film, at a cost and a floor space almost equivalent to those for a conventional picture printing system dealing with a picture recorded by only a camera using a film. As a result, the picture printing processing for both pictures can be carried out effectively by switching the inputting means upon necessity.

In this case, the picture printing system carries out the pixel number conversion on the digital image data keeping the aspect ratio constant so that the digital image data will be printed in a width almost the same as the width of rolled paper on which the image data are going to be printed. Therefore, even when the aspect ratios of pictures recorded by a camera using a film and a digital camera are different, appropriate prints of the pictures will be obtained without a portion of the pictures being unprinted or trimmed.

BRIEF DESCRIPTION OF THE DRAWINGS

FIG. 2 is a view explaining a pixel number conversion.

DESCRIPTION OF THE PREFERRED EMBODIMENT

Figure 1:
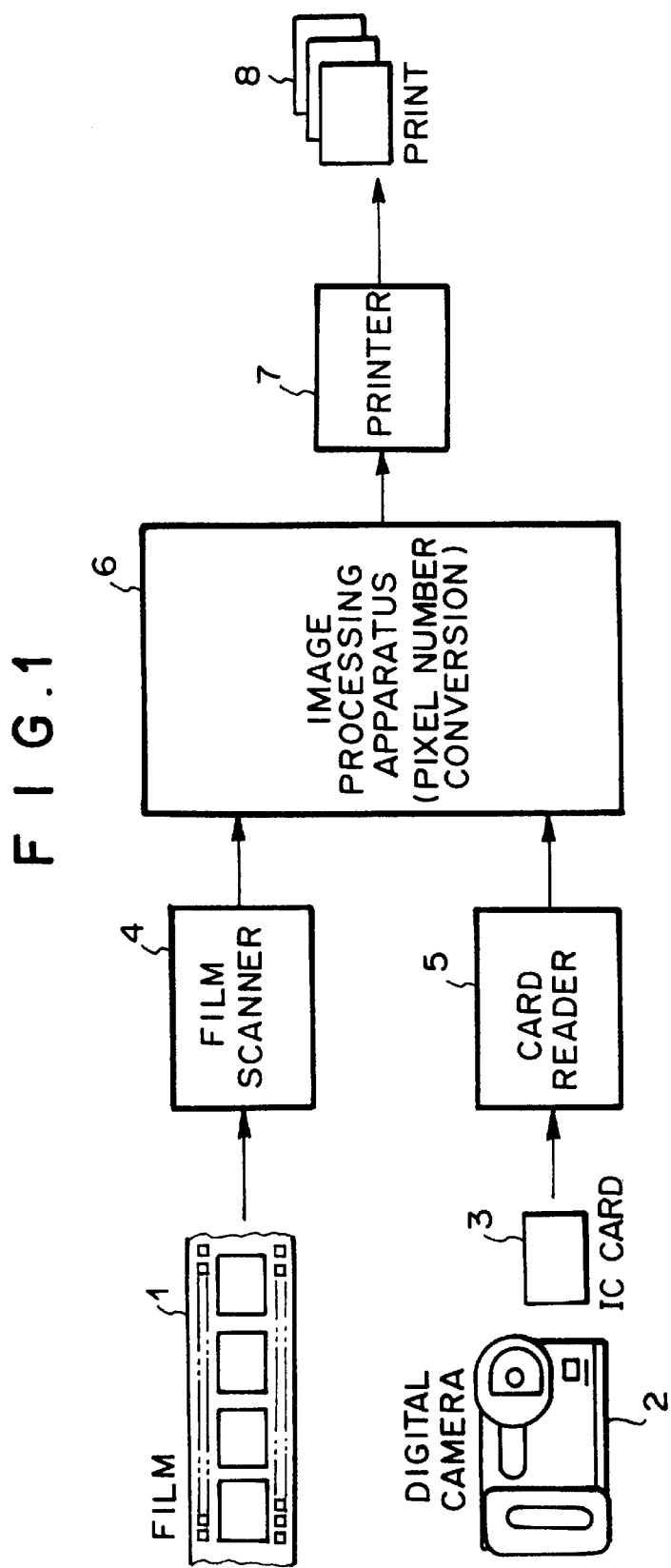
FIG. 1 is a view showing an embodiment of a picture printing system of the present invention.

Hereinafter, a picture printing system of the present invention will be explained referring to the accompanying drawings. FIG. 1 is a view showing an embodiment of the picture printing system of present invention. The picture printing system comprises a film scanner 4 for reading a picture image recorded on a film 1, a card reader 5 for reading an IC card 3 used as a memory of a digital camera 2, an image processing apparatus which carries out image processing such as a color tone correction as well as a pixel number conversion on digital image data input through the film scanner 4 and the card reader 5, and a printer 7 for outputting, in the form of a print 8, the digital image data which have been image processed by the image processing apparatus 6.

The image processing apparatus 6 obtains digital image data by selectively switching input between the film scanner 4 and the card reader 5. The switching may be carried out by directly controlling an input/output channel, or by temporarily storing input from each device in buffer memories and switching the buffer memories to be referred to. Any input/output switching method which has generally been known can be used as the switching method. The switching may be carried out manually by an operator at each film and card or at each image frame or image data. Alternatively, the switching may be carried out automatically by detecting that a film or a card is set in the scanner or the card reader respectively.

The aspect ratio of the obtained digital image is different between the images input from the film scanner 4 and the card reader 5. Moreover, even when images have been obtained by a digital camera, the aspect ratios thereof are different such that the ratio is 4:3 for an image which is assumed to be output to a screen of an ordinary TV set, and the ratio is 16:9 for an image which is assumed to be output to a screen of a high definition TV. For this reason, as shown by FIG. 2, when the images need to be printed on only one type of rolled paper, some images with certain aspect ratios can be recorded appropriately, while some portions of other images are unprinted or trimmed.

To avoid this phenomenon, the image processing apparatus 6 carries out the pixel number conversion on digital image data as shown by FIG. 2 so that the picture image size appropriately fits the width of the rolled paper. At this time, either the vertical or the horizontal length may be adjusted to the width of the rolled paper, although it is generally better for the shorter length to be adjusted to the width. The pixel number conversion may be carried out so that an image is obtained whose one side is a little longer than the width of the rolled paper when an error caused by a slight displacement in rolled paper position or the like upon printing is taken into consideration.

As described above, the picture printing system of the present invention outputs a print after the image processing apparatus 6 carries out the pixel number conversion in accordance with the rolled paper width. Therefore, only one rolled paper needs to be set, and it is not necessary to exchange rolled paper in different widths so that the width of the paper fits the input image. Furthermore, a user or an operator of the printing system does not need to pay attention to a difference in the aspect ratio between picture images recorded by a camera using a film and a digital camera. The user or the operator only has to input a picture image to be printed via the inputting means. In this manner, an effective printing operation becomes possible.

The embodiment described above is merely an example in accordance with the present invention, and the inputting means of a picture image can be a reflection type scanner or a cable interface other than the film scanner and the card reader, for example. A plurality of inputting means for a camera using a film and for a digital camera may also be provided.

Any filtering and interpolation methods can be used for the pixel number conversion. The pixel number conversion may be carried out as a single process only to convert the pixel numbers, or it may be carried out together with the processing for correcting a color or tone.

What is claimed is:

1. A picture printing system for recording digital image data representing a picture image on rolled paper having a predetermined width, comprising:

image reading means for obtaining digital image data by reading a picture image recorded on a film or in a picture print;

data inputting means for inputting an image, recorded by a digital camera in a memory as digital image data, to a processor, wherein digital image data from the image reading means and data inputting means are selectively alternated and selected for processing in the processor; and pixel number converting means for performing pixel number conversion on digital image data input from the selected image reading or data inputting means by maintaining an aspect ratio of a picture image represented by the digital image data constant, so that either the vertical or horizontal length of the picture image substantially coincides with the predetermined width.

2. The picture printing system of claim 1, wherein the digital image data is recorded in a built-in memory of the digital camera.

3. The picture printing system of claim 1, wherein the digital image data is recorded in a detachable card of the digital camera.

4. A picture printing apparatus for printing an image from a film and a digital camera on a single roller of paper, comprising:

an image reader for reading digital image data recorded on film;

an inputter for inputting digital image data recorded in a memory of a digital camera,
wherein the digital image data read from the reader and input from the inputter are selectively alternated and selected for image processing; and a converter for performing pixel number conversion on digital image data alternately selected from the film or camera by maintaining a constant aspect ratio of a picture image formed from the selected digital image data, so that the vertical or horizontal length of the picture image substantially coincides with the width of the roller, thereby precluding the need to change rolls of paper to accommodate varying picture image widths.

5. The picture printing apparatus of claim 4, wherein the converter further includes a function for setting an arbitrary magnification during pixel conversion in response to a desired input picture size so that the vertical or horizontal lengths of the picture image substantially coincide with the width of the roller.

6. The picture printing apparatus of claim 5, wherein magnifications of the pixel number conversion may be preset in advance to provide a suitable magnification for selection by an operator.

7. The picture printing apparatus of claim 4, wherein the digital image data is recorded in a built-in memory of the digital camera.

8. The picture printing apparatus of claim 4, wherein the digital image data is recorded in a detachable card of the digital camera.

9. The picture printing apparatus of claim 4, wherein the converter perform pixel number conversion by filtering or interpretation.

10. The picture printing apparatus of claim 4, wherein the digital image data read from the reader and input from the inputter are selectively alternated and selected for image processing manually by an operator at each image frame and at each image data location in the memory.

11. The picture printing apparatus of claim 4, wherein the digital image data read from the reader and input from the inputter are selectively alternated and selected for image processing by directly controlling an input/output channel.

12. The picture printing apparatus of claim 4, wherein the image reader is a scanner and the inputter is a memory card reader for reading a memory card of the digital camera, and wherein digital image data read from the scanner or memory card is automatically selected by detecting that the film or card is set in the scanner or card reader respectively.

13. The picture printing apparatus of claim 4, wherein the digital image data read from the reader and input from the inputter are selectively alternated and selected for image processing at each film frame in the film and at each image data location in the memory.

14. A method of printing an image from a film and a digital camera on a single roller of paper, comprising:

reading digital image data recorded on the film;

inputting digital image data recorded in a memory of the digital camera,
wherein the reading and inputting of digital image is selectively alternated and selected for image processing; and pixel converting digital image data alternately selected from the film or camera by maintaining a constant aspect ratio of a picture image formed from the selected digital image data, so that the vertical or horizontal length of the picture image substantially coincides with the width of the roller, thereby precluding the need to change rolls of paper to accommodate varying picture image widths.

15. The method of claim 14, wherein the digital data to be input is recorded in a built-in memory of the digital camera.

16. The method of claim 14, wherein the digital data to be input is recorded in a detachable memory of the digital camera.

* * * * *